United States Patent
Zhang et al.

(10) Patent No.: US 10,136,306 B2
(45) Date of Patent: *Nov. 20, 2018

(54) DEVICE-TYPE SPECIFIC PREFERRED PLMN LIST

(71) Applicant: Apple Inc., Cupertino, CA (US)

(72) Inventors: Qin Zhang, Mountain View, CA (US); Madhusudan Chaudhary, Campbell, CA (US); Longda Xing, San Jose, CA (US); Umesh K. Shukla, Sunnyvale, CA (US); Bo Wang, Los Gatos, CA (US); Zhiwei Wang, Beijing (CN); Yaoqi Yan, Beijing (CN); Qiang Miao, Tian Jin (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,578

(22) Filed: May 3, 2017

(65) Prior Publication Data

US 2017/0238167 A1     Aug. 17, 2017

Related U.S. Application Data

(63) Continuation of application No. 14/289,755, filed on May 29, 2014, now Pat. No. 9,668,203.

(51) Int. Cl.
*H04W 48/18* (2009.01)
*H04W 84/02* (2009.01)
(Continued)

(52) U.S. Cl.
CPC .......... *H04W 8/183* (2013.01); *H04W 8/20* (2013.01); *H04W 48/18* (2013.01); *H04W 84/042* (2013.01); *H04W 88/02* (2013.01)

(58) Field of Classification Search
CPC . H04W 48/18; H04W 36/0061; H04W 36/08; H04W 28/06; H04W 28/18;
(Continued)

(56) References Cited

U.S. PATENT DOCUMENTS 6,556,553 B1    4/2003  Palmer et al.
7,009,952 B1    3/2006  Razavilar et al.
(Continued)

FOREIGN PATENT DOCUMENTS

| EP | 1283651 A1 | 2/2003 |
| WO | 2005089249 A2 | 9/2005 |
| WO | 2006083620 A2 | 8/2006 |

OTHER PUBLICATIONS

Gahran, Amy; "Crowdsourced maps help mobile users compare network reliability"; http://www.cnn.com/2011/TECH/mobile/02/15/coverage.mapping/; Feb. 17, 2011; 2 pages.
(Continued)

*Primary Examiner* — Nizar Sivji
(74) *Attorney, Agent, or Firm* — Meyertons Hood Kivlin Kowert & Goetzel, P.C.; Jeffrey C. Hood

(57) ABSTRACT

Generating and using a device-type specific preferred public land mobile network (PLMN) list for roaming PLMN selection. Wireless devices sharing one or more common characteristics may be tasked with collecting roaming PLMN selection data. That data may be collected and used to generate a preferred PLMN list specific to wireless devices sharing those common characteristics. The preferred PLMN list may be distributed to wireless devices sharing those common characteristics, which may then use it in conjunction with roaming PLMN selection.

20 Claims, 12 Drawing Sheets

(51) Int. Cl.
*H04W 8/18* (2009.01)
*H04W 8/20* (2009.01)
*H04W 84/04* (2009.01)
*H04W 88/02* (2009.01)

(58) Field of Classification Search
CPC . H04W 36/26; H04W 36/32; H04W 52/0206; H04W 72/1215; H04W 8/183; H04W 8/20; H04W 84/042; H04W 88/02; H04L 12/5692; H04M 1/72572
See application file for complete search history.

(56) References Cited

U.S. PATENT DOCUMENTS

| | | | |
|---|---|---|---|
| 7,103,359 | B1 | 9/2006 | Heinonen et al. |
| 7,822,407 | B2 | 10/2010 | Huang et al. |
| 8,121,633 | B2 | 2/2012 | Cormier et al. |
| 8,406,756 | B1 | 3/2013 | Reeves et al. |
| 8,600,956 | B2 | 12/2013 | Kuo et al. |
| 8,774,840 | B2 | 7/2014 | Soelberg et al. |
| 2004/0014422 | A1 | 1/2004 | Kallio |
| 2006/0153063 | A1 | 7/2006 | Islam et al. |
| 2007/0173255 | A1 | 7/2007 | Tebbit et al. |
| 2009/0323632 | A1 | 12/2009 | Nix |
| 2010/0167658 | A1 | 7/2010 | Hoffman |
| 2011/0217979 | A1 | 9/2011 | Nas |
| 2013/0035095 | A1* | 2/2013 | Wang .............. H04W 4/14 455/433 |
| 2013/0046738 | A1 | 2/2013 | Kuo et al. |
| 2013/0258870 | A1* | 10/2013 | Macias ............. H04W 48/18 370/252 |
| 2013/0273908 | A1* | 10/2013 | Anantharaman ..... H04W 8/18 455/432.1 |
| 2013/0281127 | A1 | 10/2013 | Soelberg et al. |
| 2014/0004854 | A1 | 1/2014 | Veran et al. |
| 2014/0194110 | A1* | 7/2014 | Suerbaum ........ H04W 52/0203 455/418 |
| 2015/0139074 | A1 | 5/2015 | Bane et al. |
| 2015/0237560 | A1* | 8/2015 | Saida ............... H04W 36/365 370/331 |
| 2016/0095046 | A1* | 3/2016 | Tervonen ........... H04W 48/14 370/338 |
| 2016/0105820 | A1* | 4/2016 | Hamalainen ........ H04W 28/08 370/235 |

OTHER PUBLICATIONS

PRWeb; "DeadCellZones.com Launches a Consumer Cellular Coverage Rating Index"; http://www.prweb.com/releases/2002/3/prweb35525.htm; Mar. 21, 2002; 1 page.

Etherington, Darrell; "Apple Patents Crowdsourced Tracking of Mobile Network Dead Spots"; http://techcrunch.com/2014/11/11/apple-patents-crowdsourced-tracking-of-mobile-network-dead-spots/; Nov. 11, 2014; 2 pages.

Linder, Patrick; "The State of the Mobile Union"; http://www.rootmetrics.com/us/blog/special-reports/the-state-of-the-mobile-union; Mar. 5, 2014; 14 pages.

"Sensorly—Speedtests & 4G/LTE, CDMA, GSM, Wifi coverage & speed maps"; https://www.appannie.com/apps/ios/app/sensorlyspeedtests-4glte-cdma-gsm-wifi-coverage-speed-maps/; Aug. 6, 2012; 2 pages.

Coffnes, et al.; "Crowdsourcing Service-Level Network Event Monitoring"; http://www2.research.att.com/~gezihui/publication/choffnes_sigcomm10.pdf; Aug. 30, 2010; 12 pages.

FCC; "FCC Unveils New, Free Speed Test App to Empower Consumers With U.S. Mobile Broadband Performance Information—App Expands Landmark Measuring Broadband America Program to Mobile, Crowdsources Data to Assess Mobile Broadband Network Performance Nationwide"; https://www.fcc.gov/document/fcc-unveils-mobile-broadband-speed-test-app-empower-consumers; Nov. 14, 2013; 2 pages.

Fitchard, Keith; "Crowdsourced network tester OpenSignal releases on iPhone app" https://gigaom.com/2013/04/18/crowdsourced-network-tester-opensignal-releases-on-iphone-app/; Apr. 18, 2013; 4 pages.

Gember, et al.; "Obtaining In-Context Measurements of Cellular Network Performance"; http://web2.research.att.com/techdocs/TD_100758.pdf; Nov. 14, 2012; 14 pages.

Nokia Networks; "Operators can now crowdsource data on mobile broadband quality" http://networks.nokia.com/news-events/press-room/press-releases/operators-can-now-crowdsource-data-on-mobile-broadband-quality; Nov. 2, 2010; 2 pages.

"Mobile Networks Under Evaluation"; http://www.p3-group.com/downloads/2/4/8/2/9/Interview_connect_P3_July_2014.pdf; Jul. 2014; 3 pages.

Donnelly, Tara; "Optus 'crowdsourcing' to improve network coverage"; http://www.whistleout.com.au/MobilePhones/News/optus-crowdsourcing-to-improve-network-coverage; Jul. 25, 2013; 3 pages.

\* cited by examiner

DEVICE-TYPE SPECIFIC PREFERRED PLMN LIST

PRIORITY CLAIM

This application is a continuation of Ser. No. 14/289,755 titled "Device-Type Specific Preferred PLMN List" and filed May 29, 2014, whose inventors were Qin Zhang, Madhusudan Chaudhary, Longda Xing, Umesh K. Shukla, Bo Wang, Zhiwei Wang, Yaoqi Yan, Qiang Miao and which is hereby incorporated by reference in its entirety as though fully and completely set forth herein.

FIELD

The present application relates to wireless devices, and more particularly to systems and methods for generating and using device specific and device-type specific roaming PLMN lists.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

In order to utilize cellular communication, a wireless device typically first selects and registers with a public land mobile network (PLMN) which will then provide cellular communication services. Successful selection of and registration with a PLMN in roaming scenarios can however present a time- and power-consuming challenge, for example if there are multiple PLMN options in a particular location and the wireless device is lacking priority/preference information for some or all of the PLMN options.

SUMMARY

Embodiments are presented herein of methods for generating and using device specific and device-type specific roaming PLMN lists, and of devices configured to implement the methods.

According to the techniques described herein, a crowd-sourcing system may task wireless devices (e.g., of a specific device type or model) to collect data from their roaming PLMN selection experiences and provide the collected data to the crowd-sourcing system.

The crowd-sourcing system may provide the collected data, or possibly roaming PLMN selection related metrics generated based on the data, to a ranking mechanism. The ranking mechanism may use the data and/or metrics received from the crowd-sourcing system (possibly in combination with other information) to rank various PLMNs, and may generate one or more device-type specific roaming PLMN lists based on those rankings.

Each device-type specific roaming PLMN list generated by the ranking mechanism may more particularly also be Home PLMN (HPLMN) specific. In other words, a different device-type specific roaming PLMN list may be generated (i.e., with potentially different PLMN preferences/priority rankings) for each of various possible carriers.

Further according to the techniques described herein, a wireless device may receive (e.g., over the air) such a device-type specific and HPLMN specific roaming PLMN list from the ranking mechanism. The wireless device may store that list, and may perform roaming PLMN selection based at least in part (e.g., in combination with or in place of an OPLMN list) on that list.

The wireless device may be capable of receiving (and the ranking mechanism providing) updates to its device-type specific and HPLMN specific roaming PLMN list, for example periodically as additional data is collected and the device-type specific PLMN list(s) is (are) updated by the ranking mechanism.

Further according to the techniques described herein, the possibility that roaming PLMN selection based on an OPLMN list and/or the above-described device-type specific and HPLMN specific roaming PLMN list is not successful is considered. In such a case, an 'optimized other PLMN search' procedure is provided. This procedure may include generating and storing one or more device specific roaming PLMN lists based on an individual device's past roaming experience to guide future roaming PLMN selections in such a scenario.

The techniques described herein may be implemented in and/or used with a number of different types of devices, including but not limited to cellular phones, tablet computers, wearable computing devices, portable media players, cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
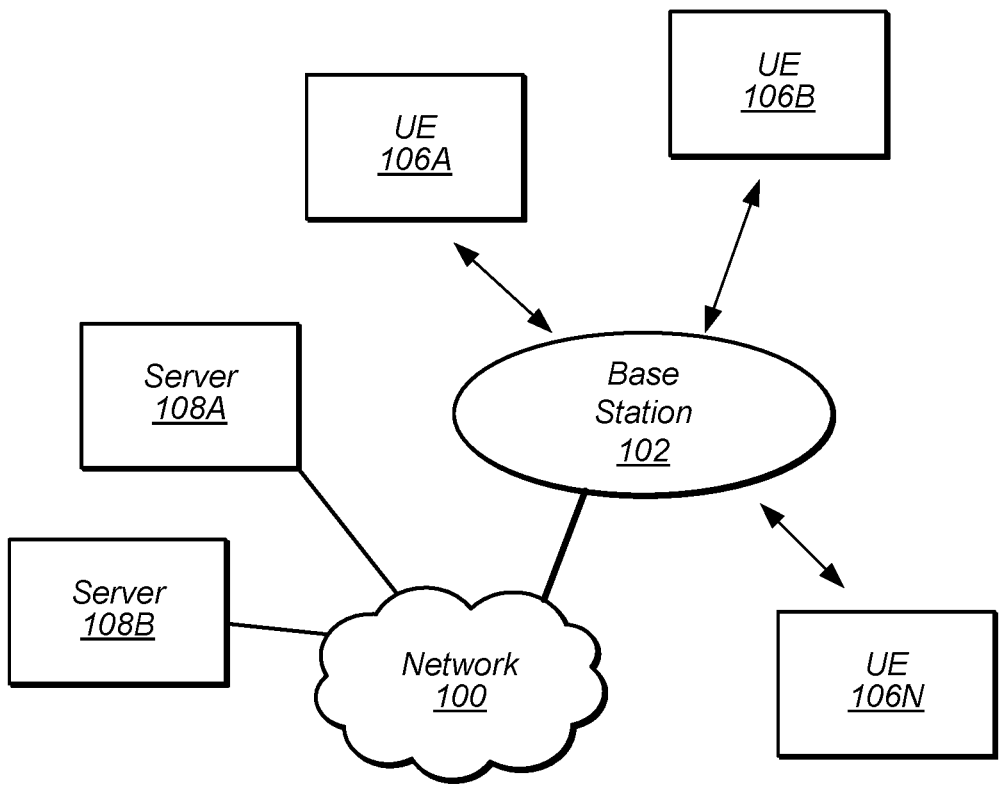
FIG. 1 illustrates an exemplary simplified wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
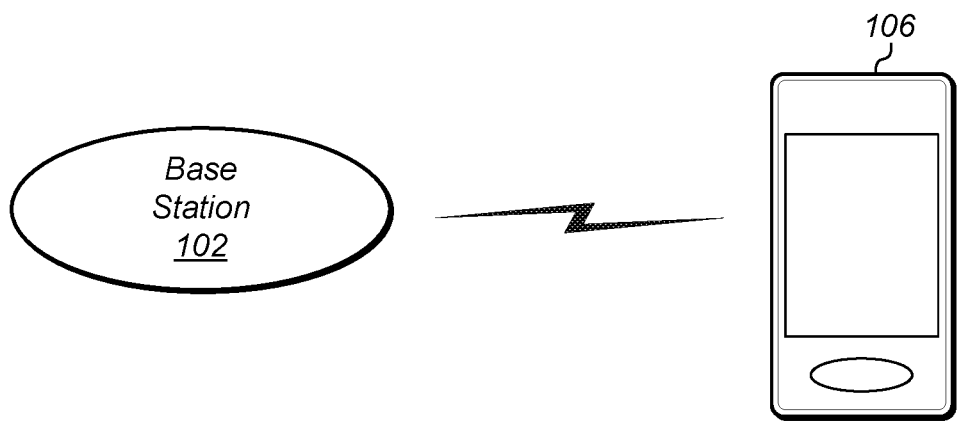
FIG. 2 illustrates a base station (BS) in communication with a user equipment (UE) device.

FIGS. 1 and 2—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The network 100 may provide a communication link between one or more servers 108 (e.g., server 108A, server 108B) and the UEs 106 (e.g., by way of base station 102). The servers 108 (individually or collectively) may provide any of a variety of services to the UEs 106. For example, a server 108 might provide a database including any of various types of information which a UE 106 may query to access the information, a cloud based service such as a media streaming service, an intelligent personal assistant service, or a mapping service, an email server, or any of various other functions. As specific possibilities, a server 108 may host a crowd sourced data gathering system which tasks wireless devices to collect certain information, and/or a ranking mechanism which generates, stores, and/or provides updates of device-type specific roaming PLMN lists based on information collected by the crowd sourced data gathering system, such as further described herein with respect to, inter alia, FIGS. 6-7.

Note that while a communication link between the UEs 106 and the servers 108 by way of the base station 102 and the network 100 represents one possible such communication link, it may also or alternatively be possible to provide such a link by other means. For example, the UEs 106 might be capable of communicating with one or more Wi-Fi access points which provide access to the network 100 or another network which is communicatively coupled to one or more of the servers 108. Additionally, one or more intermediary devices or networks in addition to or as alternatives to those shown may be part of the communication link, if desired.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), 3GPP2 CDMA2000 (e.g., 1xRTT, 1xEV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
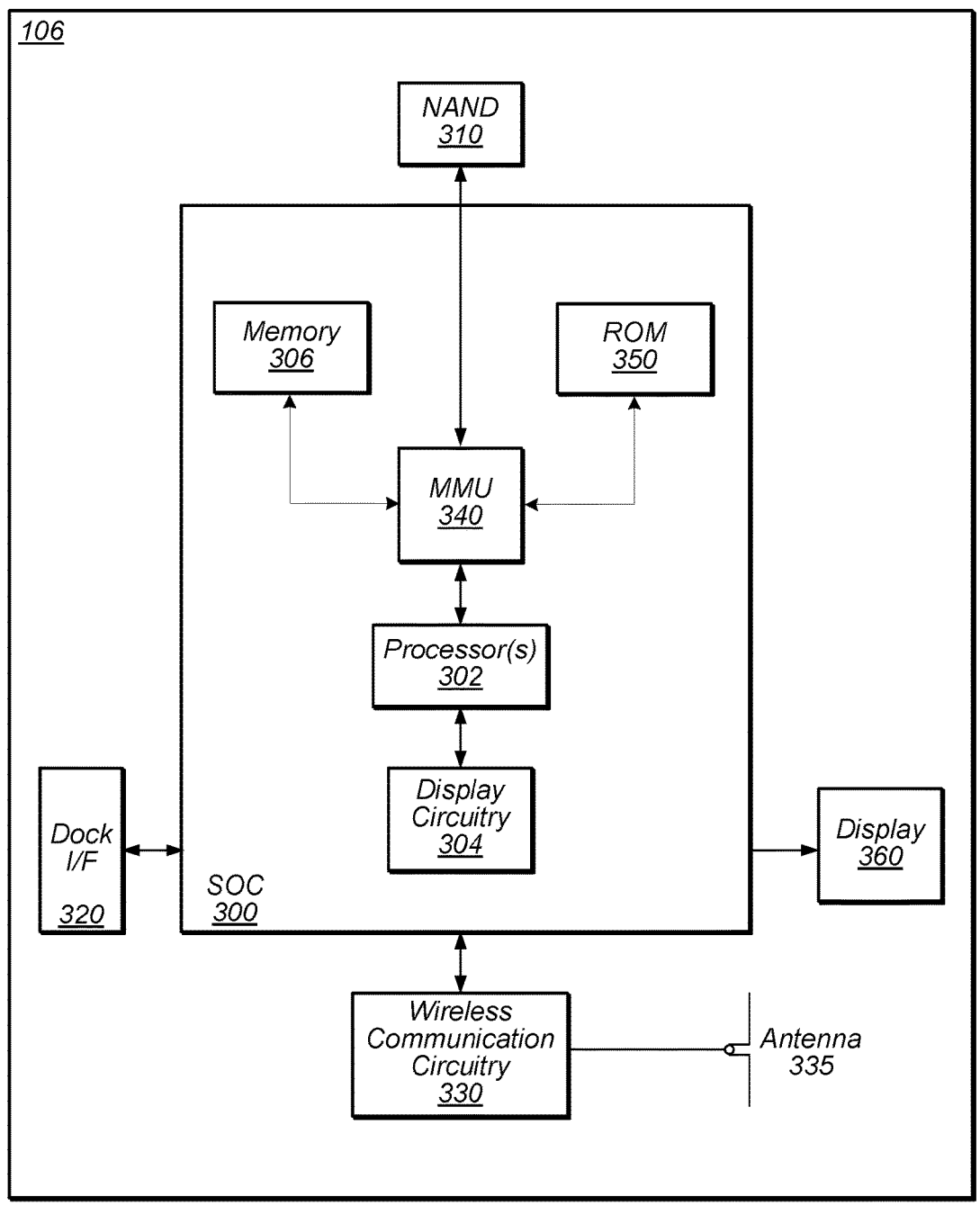
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE 106 may be configured to communicate wirelessly using multiple wireless communication standards in some embodiments.

As described further subsequently herein, the UE 106 may include hardware and software components for implementing features for utilizing device-type specific and/or device specific roaming PLMN lists, such as those described herein with reference to, inter alia, FIG. 7. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 7.

Figure 4:
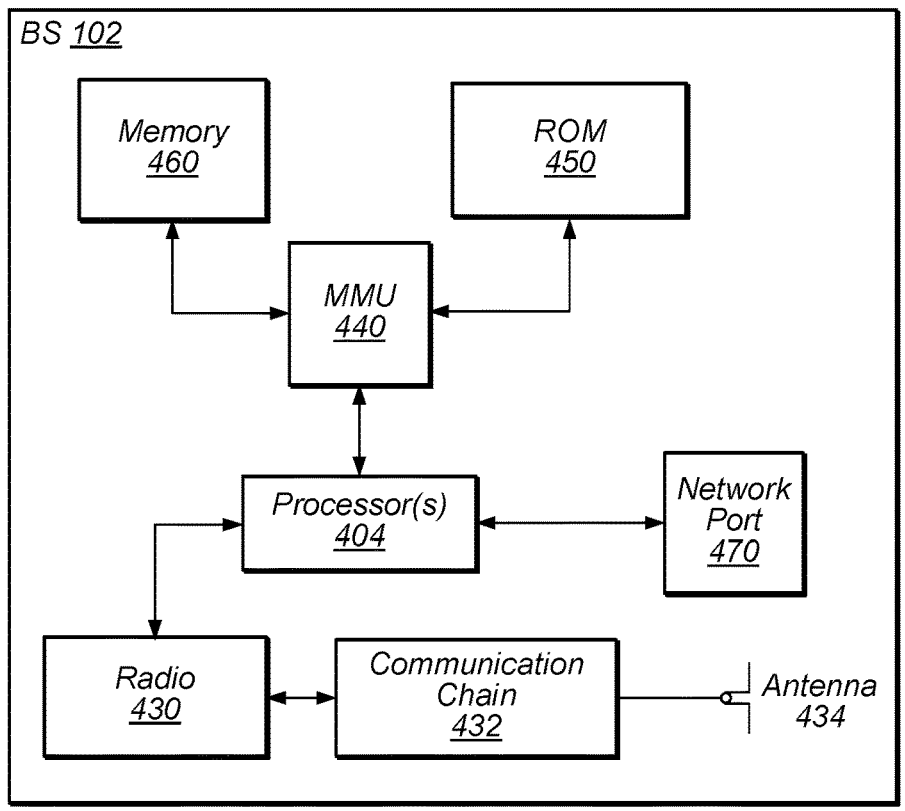
FIG. 4 illustrates an exemplary block diagram of a BS.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
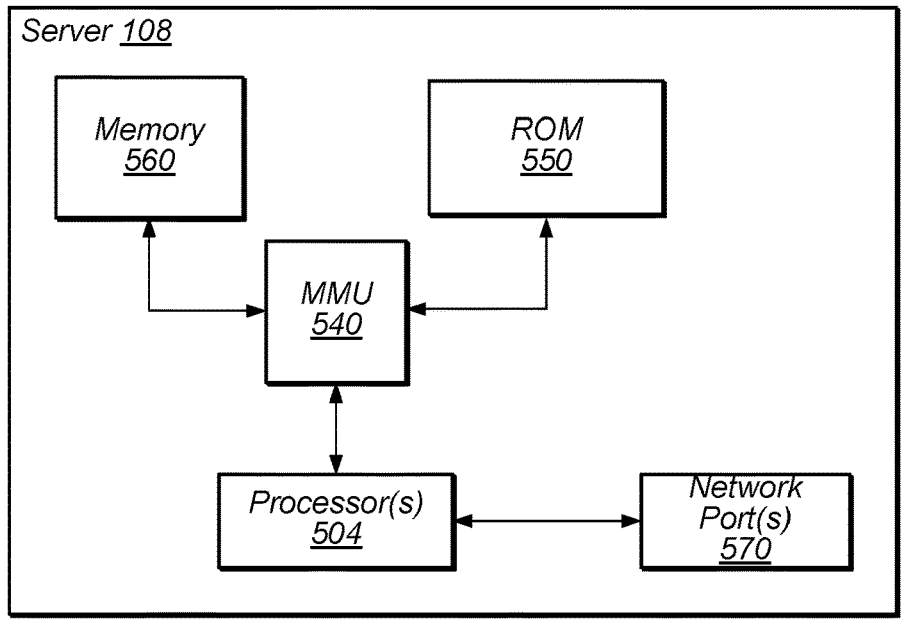
FIG. 5 illustrates an exemplary block diagram of a server computer system.

FIG. 5—Exemplary Block Diagram of a Server

FIG. 5 illustrates an exemplary block diagram of a server computer 108. It is noted that the server of FIG. 5 is merely one example of a possible server 108. As shown, the server 108 may include processor(s) 504 which may execute program instructions for the server 108. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The server 108 may include at least one network port 570. The network port(s) 570 may include wired and/or wireless ports, and may be configured to couple to any of various networks and/or network elements, including one or more local networks, intranets, cellular core networks, public switched telephone networks, and/or the Internet, among various possibilities.

Figure 6:
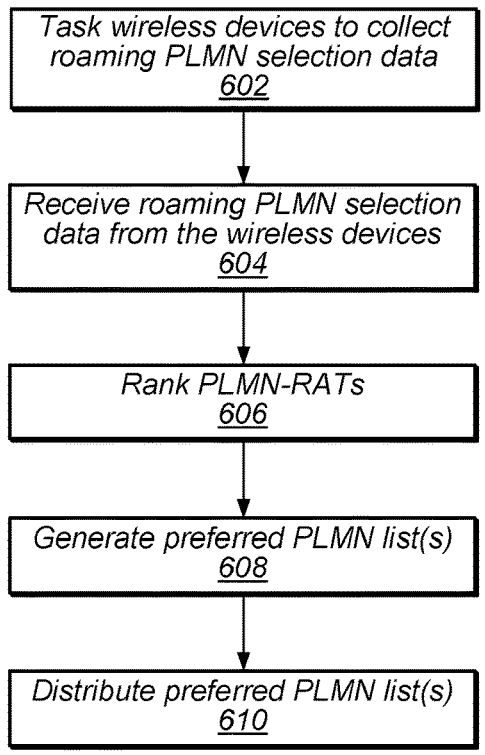
FIGS. 6-7 are flowchart diagrams illustrating exemplary methods for generating and using a device-type specific preferred PLMN list.

The server 108 may include hardware and software components for implementing features for collecting roaming PLMN selection data, and/or generating device-type specific and/or device specific roaming PLMN lists, such as those described herein with reference to, inter alia, FIG. 6. The processor 504 of the server 108 may be configured to implement or support implementation of part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof. Alternatively (or in addition) the processor 504 of the server 108, in conjunction with one or more of the other components 540, 550, 560, 570 may be configured to implement or support implementation of part or all of the features described herein, such as the features described herein with reference to, inter alia, FIG. 6.

Figure 7:
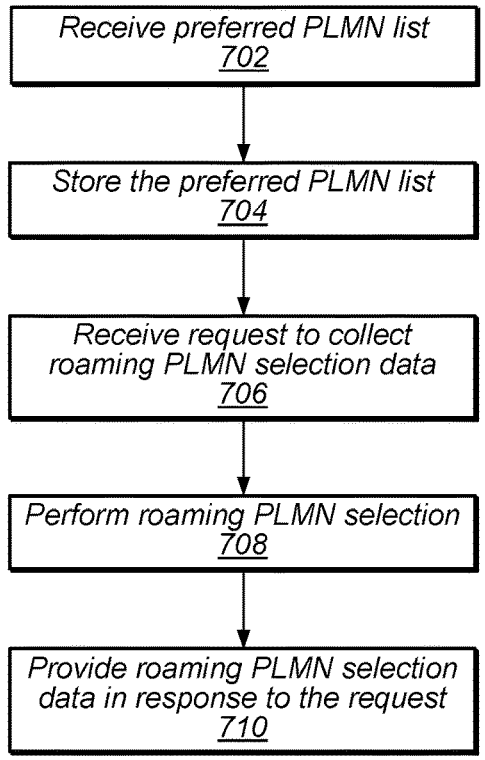

FIGS. 6-7—Flowchart Diagram

In cellular communication, cellular service providers or carriers may typically control their subscribers' wireless devices' roaming behavior by providing an operator-defined public land mobile network (OPLMN) list. The OPLMN list may be stored in the SIM card, and may specify PLMN-RAT relative priorities, which may be influenced or defined by roaming agreements between the operator providing the OPLMN list and operators of other PLMNs. PLMNs included in the OPLMN list may also be referred to as OPLMNs. A UE may select and register on a PLMN from the OPLMN list when roaming e.g., in order to quickly acquire service from suitable cellular service provider.

However, in some instances, an OPLMN list may not specify any PLMN-RATs for a current location of a UE. There may be various possible reasons why an OPLMN list might not be comprehensive. For example, SIM cards may often be limited in memory capacity, such that it may not be possible to configure the PLMN-RAT priority for all the PLMNs in the world on a particular SIM card. As another example, due to memory considerations, or for simplicity or any of various other reasons, a carrier might not configure a PLMN as an OPLMN even if there is a roaming agreement if the carrier also has roaming agreements with multiple other PLMNs in the location in which that PLMN operates and all of them have equal priority. Furthermore, in at least some cases it may be possible for one or more OPLMN entries in the OPLMN list on the SIM card to become out-dated and incorrect, which may result in delayed service acquisition.

When no OPLMN is available in a roaming scenario, a possible fall-back option may be for the UE to randomly select an available PLMN and try to register. However, with such a random selection, there may be a significant likelihood that the visited PLMN (VPLMN) may reject the registration request, or try to push the UE away with steering, which may cause a significant delay for the UE to acquire service.

FIG. 6 is a flowchart diagram illustrating a method for generating device-type specific preferred PLMN lists for supplementing or replacing OPLMN lists. Such a device-type specific preferred PLMN list may potentially be more comprehensive and accurate/up-to-date than OPLMN lists, and may thus potentially improve the roaming PLMN selection process at a UE, e.g., by reducing PLMN selection and registration delays.

The method shown in FIG. 6 may be used in conjunction with any of the computer systems or devices shown in the above Figures, among other devices. As one possibility, the method of FIG. 6 may be implemented by one or more server computer systems, such as server 108 illustrated in and described with respect to FIGS. 1 and 5. In various embodiments, some of the elements of the method shown may be performed concurrently, in a different order than shown, or may be omitted. Additional elements may also be performed as desired. As shown, the method may operate as follows.

In 602, wireless devices may be tasked with collecting roaming PLMN selection data. In at least some instances, the wireless devices tasked to collect such data may share one or more common characteristics on which their tasking may be partially or substantially based. As a particular example, the wireless devices may all be of a particular device type, such as wireless devices sold by a particular device vendor. In some instances, the commonality may even more particularly be that the wireless devices are a specific device model sold by that device vendor. As another example (alternatively or in addition), all of the wireless devices may utilize some common software, such as a common operating system. Other characteristics in common may also be possible.

The wireless devices may be tasked to collect the roaming PLMN selection data by a "crowd-sourcing" module, which may execute on a server. Tasking the wireless devices to collect the roaming PLMN selection data may include providing an indication requesting such data collection or enabling a pre-configured feature for such data collection to those wireless devices by way of a (possibly at least partially over-the-air) network connection. For example, if the tasked wireless devices are of a specific device type sold by a particular vendor, that vendor may configure those devices (e.g., with user opt-in/opt-out capability) to be able to collect and provide various diagnostic and operating statistics to servers operated by that vendor to monitor and help inform design improvements to aggregate device performance using crowd-sourced information. In such a case, those wireless devices which accept such tasking may include the roaming PLMN selection data among the various diagnostic and operating statistics to be collected.

The roaming PLMN selection data may include any of various data relating to roaming PLMN selection attempts performed by the wireless devices. For example, each tasked wireless device may collect any or all of the following information types, on each occasion that the wireless device attempts to perform a roaming PLMN selection: the home PLMN (HPLMN) of the wireless device; the visited PLMN (VPLMN) which the wireless device has selected and is attempting to register with; whether or not the VPLMN is considered an equivalent home PLMN (EHPLMN); a result (e.g., success or failure) of the registration attempt; a number of registration retries attempted; a reject cause code (e.g., if rejected); a service domain; and a RAT used in conjunction with the attempted PLMN selection. Other types of information may alternatively or additionally be collected, as desired.

In 604, the roaming PLMN selection data collected by the wireless devices may be received from the wireless devices. The wireless devices may provide collected data upon collection of the data (e.g., following each roaming PLMN selection attempt), or may store collected data for a period of time and provide a batch of collected data for roaming PLMN selection attempts during that period of time all at once. Such data batches may be provided based on number of results (e.g., once a certain number of entries are collected, a batch may be provided), at scheduled times (e.g., on a predetermined periodic basis or at a time which is dynamically scheduled by the "crowd-sourcing" module to which the data is provided), or based on any of various other considerations. Additionally, note that each of the wireless devices may provide data on an individual schedule, or groups of wireless devices may provide data on similar schedules, as desired.

In 606, PLMN-RATs may be ranked in an order of preference for roaming PLMN selection. The term "PLMN-RAT" may refer to a combination of a PLMN and a radio access technology according to which that PLMN may be acquired by a UE. For example, if a given PLMN operates in parallel according to each of multiple RATs, the priority assigned to accessing the PLMN according to one of those RATs may be different than the priority assigned to accessing the PLMN according to one or more other of those RATs. Accordingly, each RAT according to which a PLMN may be accessed may be considered separately as a "PLMN-RAT".

The PLMN-RAT rankings may be based at least in part on the roaming PLMN selection data collected from the wireless devices. For example, PLMN-RATs which exhibit a higher proportion of successful registrations according to the roaming PLMN selection data may tend to be ranked higher than PLMN-RATs which exhibit a lower proportion of successful registrations according to the roaming PLMN selection data. PLMN-RAT rankings may further be influenced by whether or not a given PLMN-RAT is flagged as an EHPLMN (e.g., an EHPLMN may be ranked higher than a non-EHPLMN), an average number of retries to obtain registration success (e.g., PLMNs with lower numbers of retries may be ranked higher), and/or reject cause code distributions (e.g., proportion of fatal vs. non-fatal, where fewer fatal reject codes may increase PLMN ranking), among other possible metrics obtained from the crowd-sourced roaming PLMN selection data.

At least in some instances, the PLMN-RAT rankings may be HPLMN specific. Furthermore, if desired, multiple sets of PLMN-RAT rankings may be created, where each PLMN-RAT ranking corresponds to a different HPLMN. In such cases, each HPLMN's roaming PLMN-RAT rankings may be based on roaming PLMN selection data collected from those wireless devices with that particular HPLMN.

Note that if desired, the PLMN-RAT rankings may also be influenced by one or more other considerations, e.g., in addition to the roaming PLMN selection data collected from the wireless devices. For example, if such information is available, factors such as data or voice performance (e.g., packet error rate, throughput obtained, etc.) of each PLMN-RAT (or at least each PLMN) may be considered when ranking the PLMN-RATs. Information obtained directly from carriers may also be used as a consideration when ranking the PLMN-RATs, if desired; for example, updated information regarding a particular carrier's roaming agreements might be considered when generating HPLMN specific PLMN-RAT rankings for that carrier. Additionally, RAT preferences may be considered, if desired; for example, the ranking mechanism may include a weighting factor for each of various RATs based on characteristics or preferences (e.g., newer, faster, less expensive for the user, etc.) relating to each of those RATs.

Note that PLMN-RAT ranking may be performed by a different module (e.g., a "ranking" module or mechanism) than the crowd-sourcing module (which may execute in the same or a different server), if desired. For example, the crowd-sourcing module may task UEs with collecting roaming PLMN selection data and receive that data, may perform data processing and metric creation on that data, and may provide various metrics/statistics harvested on that basis to the PLMN-RAT ranking mechanism. The PLMN-RAT ranking mechanism may then perform the actual ranking based on the various metrics/statistics received from the crowd-sourcing module and any other metrics or considerations. Alternatively, gathering the PLMN roaming selection data from the wireless devices and performing the PLMN-RAT rankings may be performed by the same functional block, if desired.

In 608, one or more preferred PLMN lists may be generated. The preferred PLMN list(s) may be generated based on the PLMN-RAT rankings. For example, for each HPLMN for which PLMN-RATs are ranked, an HPLMN specific preferred PLMN list based on those rankings may be generated.

In 610, the preferred PLMN list(s) may be distributed. Distributing the preferred PLMN list(s) may include providing each HPLMN specific preferred PLMN list to wireless devices (e.g., of the appropriate device-type) with the corresponding HPLMN. Each such wireless device may subsequently use that preferred PLMN list in conjunction with roaming PLMN selection, such as further described subsequently herein with respect to FIG. 7. The preferred PLMN list(s) may be distributed to each wireless device as an over-the-air (OTA) configuration update via wireless communication, or in any of various other ways, as desired.

Note that if desired, parts or all of the method of FIG. 6 may be repeated and/or performed in an ongoing manner. For example, PLMN roaming selection data may be collected and provided to the crowd-sourcing module on an ongoing basis by wireless devices, which may continuously or occasionally update the metrics and statistics generated from the crowd-sourced data. Similarly, the ranking mechanism may occasionally (e.g., periodically or dynamically) update the rankings (e.g., based on updated crowd-sourced data, new roaming agreement information from carriers, and/or any of various other changes), generate new (updated) device-type and HPLMN specific preferred PLMN lists, and provide those lists to wireless devices of corresponding device-type and HPLMN as OTA updates.

Thus, device-type specific preferred PLMN lists may be created by harvesting crowd-sourced information relating to previous roaming PLMN selection attempts by devices of a specific device type, and those lists may be distributed to devices of that device type and used for those devices' roaming PLMN selections. Because the data used to generate the preferred PLMN lists may have been obtained from wireless devices with common characteristics, the resulting list may be particularly suited for such wireless devices, and its use may result in reduced PLMN selection and registration time and/or better roaming PLMN selection choices by such wireless devices.

Whereas FIGS. 6 illustrates a method for generating device-type specific preferred PLMN lists for supplementing or replacing OPLMN lists, as previously noted, FIG. 7 is a flowchart diagram illustrating a method for performing roaming PLMN selection in a manner using such a device-type specific preferred PLMN list to supplement or replace the use of an OPLMN list.

The method shown in FIG. 7 may be used in conjunction with any of the computer systems or devices shown in the above Figures, among other devices. As one possibility, the method of FIG. 7 may be implemented by a wireless user equipment device such as UE 106 illustrated in and described with respect to FIGS. 1-3. In various embodiments, some of the elements of the method shown may be performed concurrently, in a different order than shown, or may be omitted. Additional elements may also be performed as desired. As shown, the method may operate as follows.

In 702, the UE may receive a preferred PLMN list. The preferred PLMN list may be device-type specific, i.e., in a manner corresponding to a device-type of the UE. For example, preferred PLMN list may be specific to wireless devices sold by a particular device vendor, or more particularly to wireless devices of a specific device model sold by that device vendor. Alternatively or in addition, the device-type specificity may relate to one or more other common characteristics of a particular type of device.

Additionally, at least in some instances, the preferred PLMN list may be specific to a carrier to which the UE is subscribed. The PLMN provided by that carrier may be the UE's HPLMN, and thus in such a case the preferred PLMN list may not only be device-specific, but may also be HPLMN-specific.

The preferred PLMN list may include various PLMN-RATs, which may be ranked in a priority or preference order for selecting a PLMN-RAT when roaming when using the device-type specific preferred PLMN list for roaming PLMN selection. Said another way, the device-type specific preferred PLMN list may rank PLMNs as visited PLMN (VPLMN) candidates in a manner specific to the device type of the UE (and possibly also the HPLMN of the UE). The device-type specific preferred PLMN list may include PLMN-RAT information for any or all of various possible regions/locations, be structured in any of various ways as desired. For example, the device-type specific preferred PLMN list may include different portions with separate PLMN-RAT rankings for different geographical regions (e.g., based on mobile country codes or MCCs), or may include a single comprehensive PLMN-RAT ranking list, or may be structured in any of various other ways.

In 704, the device-type specific preferred PLMN list may be stored by the UE. At least in some instances, the device-type specific preferred PLMN list may be stored in device memory, e.g., as opposed to on a subscriber identity module (SIM) card which may be coupled to the UE.

In 706, a request to collect roaming PLMN selection data may be received. The request may be from a crowd-sourcing module, such as described herein above with respect to FIG. 6. The data to be collected may similarly include any or all of the roaming PLMN selection data types described herein above with respect to FIG. 6

In 708, roaming PLMN selection may be performed by the UE. The roaming PLMN selection may utilize the device-type specific preferred PLMN list. In some instances, the device-type specific preferred PLMN list may be used in addition to an OPLMN list. For example, the UE may perform roaming PLMN selection with a first preference to selecting a PLMN with which to register based on the OPLMN list and with the device-type specific preferred PLMN list providing backup PLMN selection options in case PLMN selection using the OPLMN list is unsuccessful. Alternatively, the UE may perform roaming PLMN selection with a first preference to selecting a PLMN with which to register based on the device-type specific preferred PLMN list and with the OPLMN list providing backup PLMN selection options in case PLMN selection using the device-type specific preferred PLMN list is unsuccessful. As a still further possibility, if desired the device-type specific preferred PLMN list may be used in place of the OPLMN list.

While performing roaming PLMN selection, the UE may collect the requested roaming PLMN selection data for each attempt to select and register with a PLMN based on the request to do so.

In 710, the roaming PLMN selection data collected by the UE while performing roaming PLMN selection may be provided to the crowd-sourcing module in response to the request. The UE may provide the collected data upon collection of the data (e.g., following each roaming PLMN selection attempt), or may store collected data for a period of time and provide a batch of collected data for roaming PLMN selection attempts during that period of time all at once. Such data batches may be provided based on number of results, at scheduled times, or based on any of various other considerations.

As previously described herein with respect to FIG. 6, updated device-type specific preferred PLMN lists may occasionally be generated, for example based on such roaming PLMN selection data as collected and provided by a UE according to the method of FIG. 7. Thus, at least in some instances, the UE may at some subsequent time receive (e.g., as an OTA update) an updated device-type specific preferred PLMN list. The UE may in such a case replace the previously stored device-type specific preferred PLMN list with the most recently received version and use it in conjunction with subsequent roaming PLMN selections.

Figure 8:
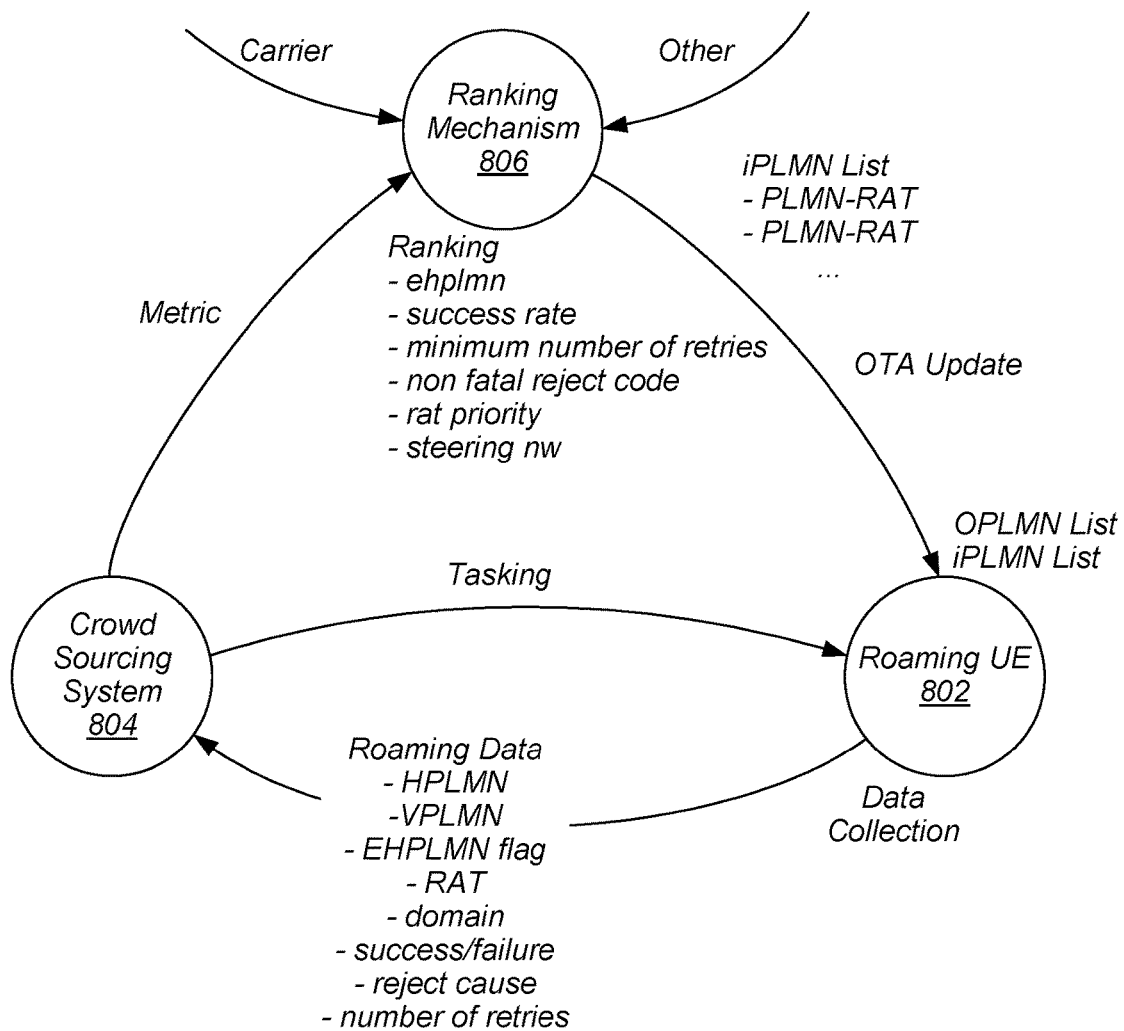
FIG. 8 illustrates exemplary data flow between entities which may collectively implement aspects of the methods of FIGS. 6-7.

FIG. 8—Data Flow Diagram

FIG. 8 illustrates exemplary data flow between functional blocks which may implement various portions of the methods of FIGS. 6-7 according to one possible implementation. It should be noted, however, that the exemplary details illustrated in and described with respect to FIG. 8 are not intended to be limiting to the disclosure as a whole: numerous variations and alternatives to the details provided herein below are possible and should be considered within the scope of the disclosure.

As illustrated, the functional blocks may include a roaming UE 802 (which may be representative of any of multiple UEs), a crowd sourcing system 804, and a ranking mechanism 806.

The crowd sourcing system 804 may task the roaming UE 802 to perform data collection based on the results of its roaming PLMN selection(s).

The roaming UE 802 may utilize a device-type specific preferred PLMN list (which may alternately be referred to herein with respect to FIGS. 8-11 as an "iPLMN" list for convenience), and/or possibly an OPLMN list, to perform roaming PLMN selection. The roaming UE 802 may perform data collection based on the results of its roaming PLMN selection(s). The roaming data collected may then be provided to the crowd sourcing system 804.

The crowd sourcing system 804 may perform data analysis and metric creation on the roaming data received from the roaming UE 802 (and other similar roaming UEs). These metrics may then be provided to the ranking mechanism 806.

The ranking mechanism 806 may consider the metrics, possibly in conjunction with information received from a carrier and/or any of various other information, and may rank various possible PLMNs for roaming PLMN selection priority for devices with similar profiles (e.g., same device type, same carrier) as the roaming UE 802 and other roaming UEs from which roaming data was collected. This resulting iPLMN list may then be provided as an OTA update to the roaming UE 802 (and other similar roaming UEs) to be used in further roaming PLMN selection decisions.

Figure 9:
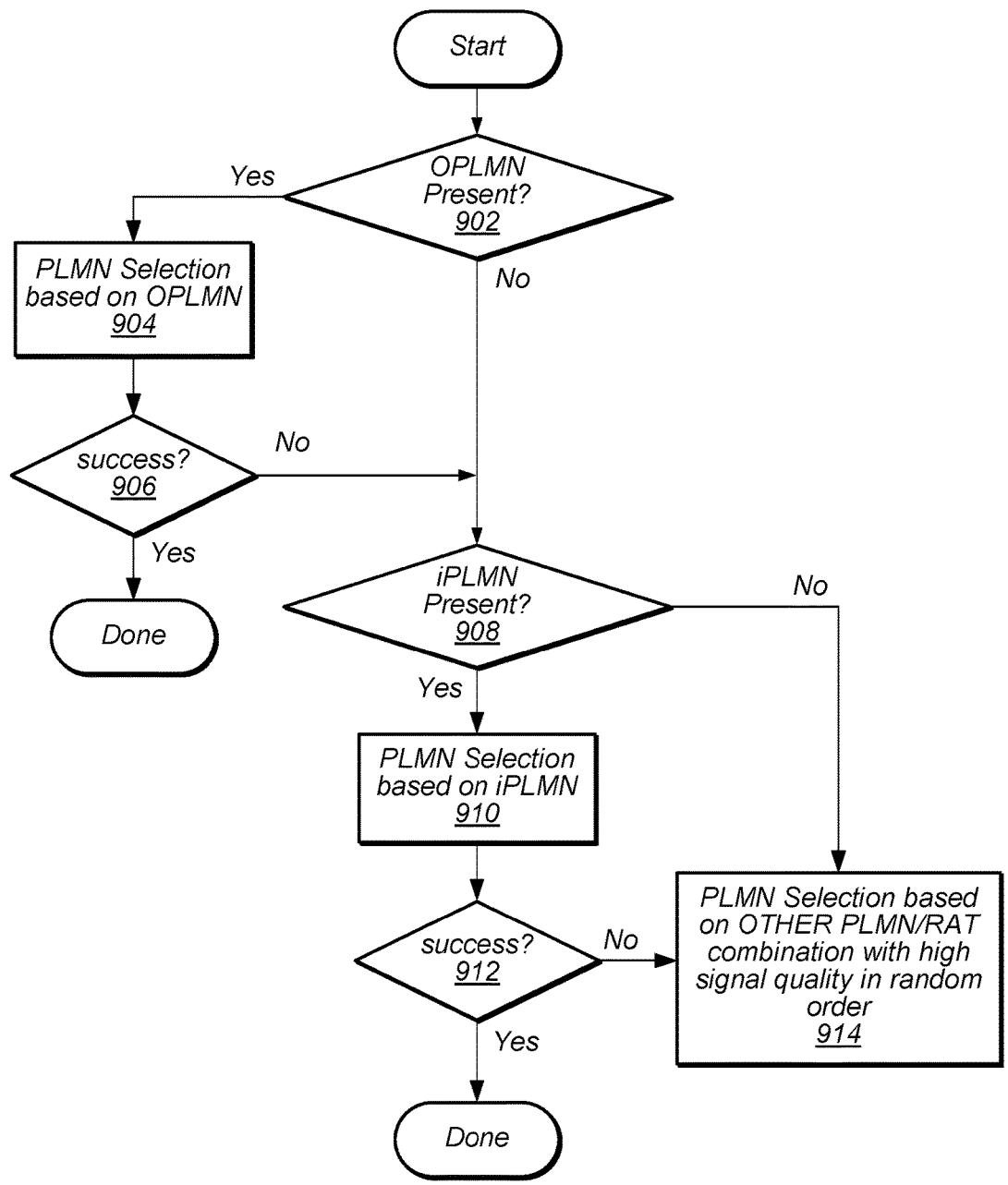
FIGS. 9-11 are flowchart diagrams illustrating exemplary roaming PLMN selection algorithms which may be used in conjunction with the methods of FIGS. 6-7.
Figure 10:
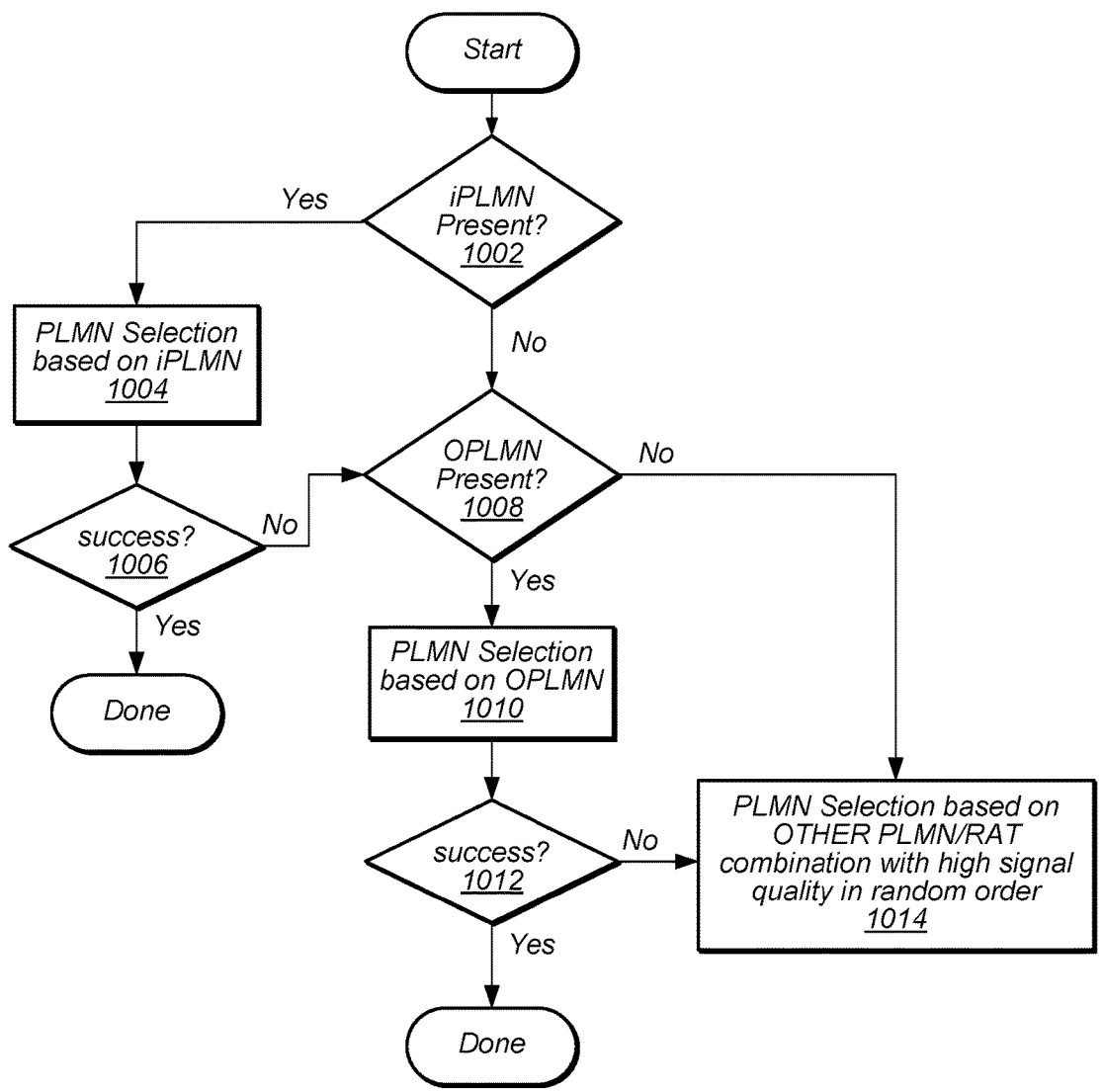
Figure 11:
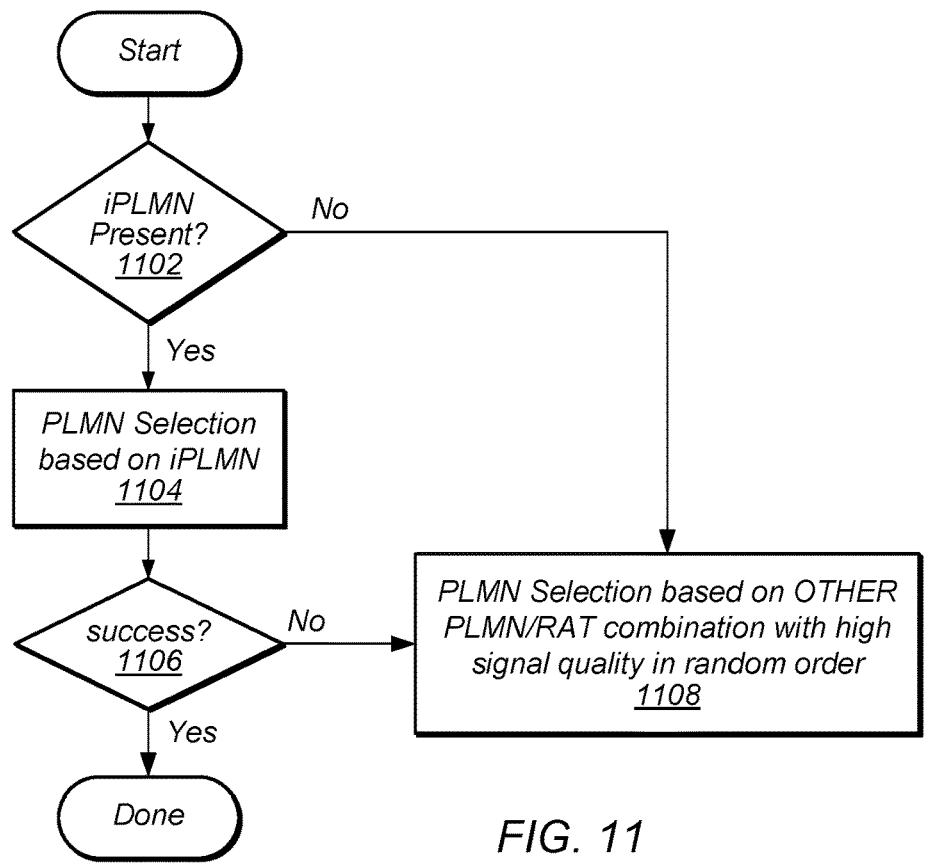

FIGS. 9-11—Flowchart Diagrams

FIGS. 9-11 are flowchart diagrams illustrating exemplary algorithms for performing roaming PLMN selection based on an iPLMN list and/or an OPLMN list such as might be used in conjunction with the methods of FIGS. 6-7 if desired. It should be noted, however, that the exemplary details illustrated in and described with respect to FIGS. 9-11 are not intended to be limiting to the disclosure as a whole: numerous variations and alternatives to the details provided herein below are possible and should be considered within the scope of the disclosure.

FIG. 9 illustrates an exemplary configuration in which a UE preferentially uses an OPLMN list for roaming PLMN selection, with an iPLMN used as a fall-back option if PLMN selection based on the OPLMN is unsuccessful.

As shown, in 902, it may be determined whether or not an OPLMN (i.e., a PLMN which is included on an OPLMN list) is present. If one or more OPLMNs are present, in 904 the UE may attempt PLMN selection based on the OPLMN(s). In 906, if this selection and registration process is successful, roaming PLMN selection may be complete.

If PLMN selection based on OPLMN is not successful, however, the method may proceed to step 908 in which it may be determined whether or not an iPLMN (i.e., a PLMN which is included on the iPLMN list) is present. If one or more iPLMNs are present, in 910 the UE may attempt PLMN selection based on the iPLMN(s). In 912, if this selection and registration process is successful, roaming PLMN selection may be complete.

If in 908 it is determined that no iPLMN is present, or if in 912 it is determined that PLMN selection based on the iPLMN is unsuccessful, the method may proceed to step 914, in which a further fall-back PLMN selection process may be performed (e.g., PLMN selection from other PLMN-RAT combinations with high signal quality in a random order, as one possibility).

FIG. 10 illustrates an exemplary configuration in which a UE preferentially uses an iPLMN list for roaming PLMN selection, with an OPLMN used as a fall-back option if PLMN selection based on the iPLMN is unsuccessful.

As shown, in 1002, it may be determined whether or not an iPLMN is present. If one or more iPLMNs are present, in 1004 the UE may attempt PLMN selection based on the iPLMN(s). In 1006, if this selection and registration process is successful, roaming PLMN selection may be complete.

If PLMN selection based on iPLMN is not successful, however, the method may proceed to step 1008 in which it may be determined whether or not an OPLMN is present. If one or more OPLMNs are present, in 1010 the UE may attempt PLMN selection based on the OPLMN(s). In 1012, if this selection and registration process is successful, roaming PLMN selection may be complete.

If in 1008 it is determined that no OPLMN is present, or if in 1012 it is determined that PLMN selection based on the OPLMN is unsuccessful, the method may proceed to step 1014, in which a further fall-back PLMN selection process may be performed.

FIG. 11 illustrates an exemplary configuration in which a UE uses an iPLMN list for roaming PLMN selection in place of an OPLMN (e.g., the OPLMN may be overwritten by the iPLMN).

As shown, in 1102, it may be determined whether or not an iPLMN is present. If one or more iPLMNs are present, in 1104 the UE may attempt PLMN selection based on the iPLMN(s). In 1106, if this selection and registration process is successful, roaming PLMN selection may be complete.

If in 1102 it is determined that no iPLMN is present, or if in 1106 it is determined that PLMN selection based on the iPLMN is unsuccessful, the method may proceed to step 1108, in which a further fall-back PLMN selection process may be performed.

FIGS. 12-17—'Other' PLMN Selection Process

As noted with respect to FIGS. 9-11, at least in some instances it may be possible that roaming PLMN selection based on OPLMN or iPLMN may be unsuccessful, and a fallback technique for PLMN selection may be used. FIGS. 12-17 provide an overview of a roaming PLMN selection process encompassing such possibilities, and illustrating various aspects of certain 'other PLMN selection' techniques.

Figure 12:
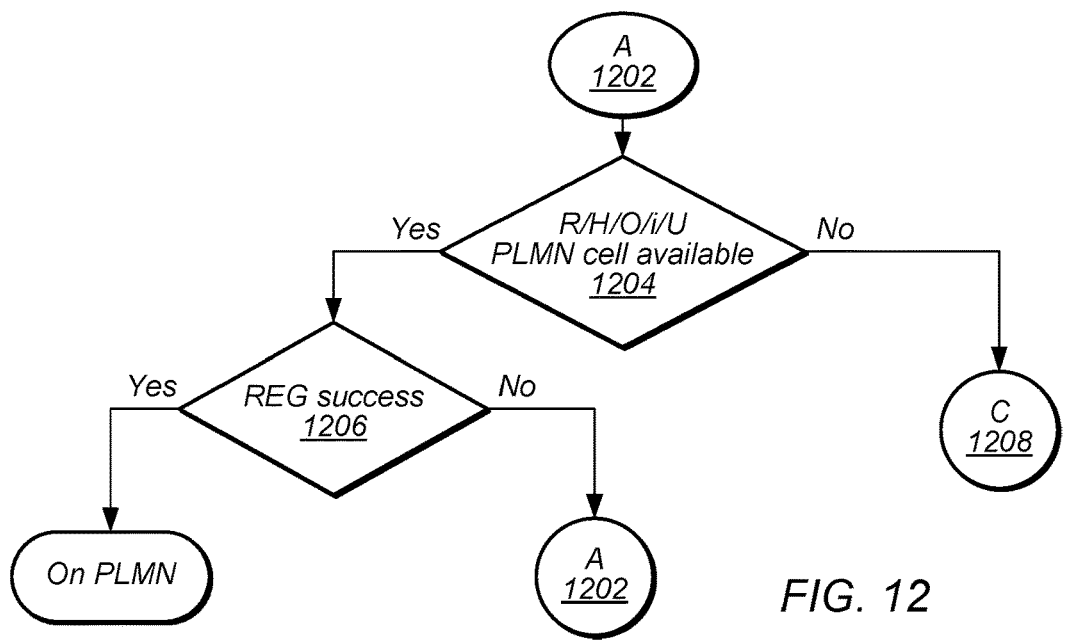
FIGS. 12-14 are flowchart diagrams illustrating an exemplary overall PLMN selection algorithm including an 'other PLMN selection' process.
Figure 13:
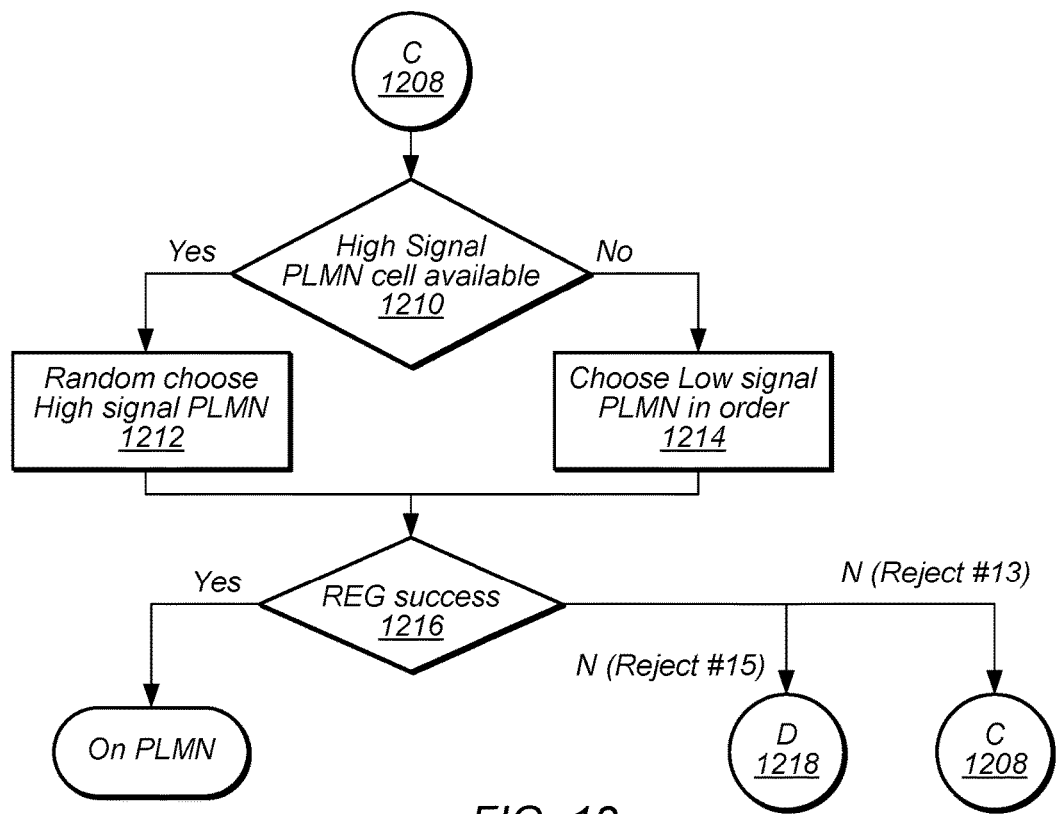
Figure 14:
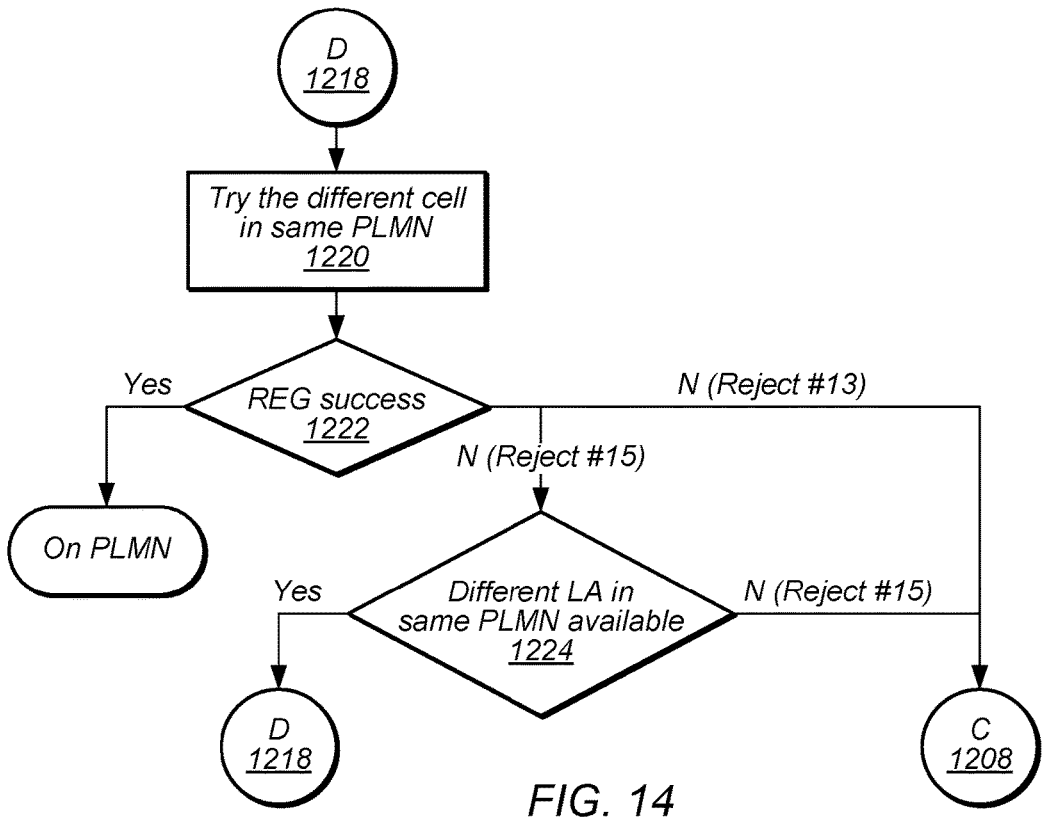

FIGS. 12-14 illustrate aspects of an exemplary overall PLMN selection algorithm such as may be used by 3GPP compliant wireless devices. For example, the method illustrated in FIGS. 12-14 may correspond to techniques for 'other PLMN selection' described in 3GPP TS 23.122.

FIG. 12 illustrates a first portion of the exemplary overall PLMN selection algorithm. As shown, upon powering on, recovering from out-of-service, or in various other possible situations, a UE may initiate a PLMN selection process at point 'A' 1202. From point A 1202, the method may proceed to decision 1204, in which it may be determined whether any of a registered PLMN (RPLMN), HPLMN, OPLMN, iPLMN, or UPLMN cell is available.

If any such cells are available, an attempt to register on such a cell may be made. In 1206, if the registration attempt is successful, PLMN selection may be complete. If the registration attempt is unsuccessful, the algorithm may proceed back to point A 1202.

If at decision 1204 it is determined that no R/H/O/i/U PLMN cell is available, however, the algorithm may proceed to point 'C' 1208.

FIG. 13 illustrates a second portion of the exemplary overall PLMN selection algorithm, which may begin at point 'C' 1208 illustrated in FIG. 12.

The algorithm may proceed from point 'C' 1208 to decision 1210, at which it may be determined whether a high signal PLMN cell is available. A 'high signal PLMN cell' may be a cell whose signal strength (and/or possibly signal quality) is greater than a certain 'high signal' threshold. Cell signal strength may be measured in received signal reference power (RSRP, e.g., in LTE), received signal code power (RSCP, e.g., in WCDMA), and/or any other suitable metric, and the 'high signal' threshold may be configured as desired, possibly on a per-RAT basis.

If a high signal PLMN cell is available, in 1212 a random choice among available high signal PLMN cells may be made, and at attempt to register on that PLMN via that cell may be made. If no high signal PLMN cell is available, in 1214 a low signal PLMN cell with a highest signal strength among remaining available cells may be chosed, and at attempt to register on that PLMN via that cell may be made. From either step 1212 or 1214, the algorithm may proceed to decision 1216, in which it may be determined whether or not the registration attempt was successful. If the registration attempt is successful, PLMN selection may be complete. Otherwise, if reject cause code #13 is given in conjunction with an unsuccessful registration, the method may return to point 'C' 1208, or if reject cause code #15 is given in conjunction with an unsuccessful registration, the method may proceed to point 'D' 1218.

FIG. 14 illustrates a third portion of the exemplary overall PLMN selection algorithm, which may begin at point 'D' 1218 illustrated in FIG. 13.

From point 'D' 1218, the algorithm may proceed to step 1220, in which an attempt may be made to register with a different cell in the same PLMN. In 1222, it may be determined whether or not the registration attempt is successful. If the registration attempt is successful, PLMN selection may be complete. Otherwise, if reject cause code #13 is given in conjunction with an unsuccessful registration, the method may return to point 'C' 1208, or if reject cause code #15 is given in conjunction with an unsuccessful registration, the method may proceed to decision 1224. Decision 1224 may include determining whether or not a cell of the same PLMN with a different location area (LA) is available. If yes, the method may proceed back to point 'D' 1218, while if no, the method may proceed back to point 'C' 1208.

The exemplary 'other PLMN selection' algorithm illustrated in FIGS. 12-14 may, due at least in part to the substantial number of potential random selections, require a significant amount of time to find a suitable PLMN selection target, if one is to be found at all. Furthermore, the portion of the algorithm centered on reject cause code #15 can result in a UE spending a significant amount of time repeatedly and unsuccessfully attempting to register with different cells of a PLMN, and possibly only 'escaping' once all location areas and tracking areas available for this PLMN have been exhausted.

Figure 15:
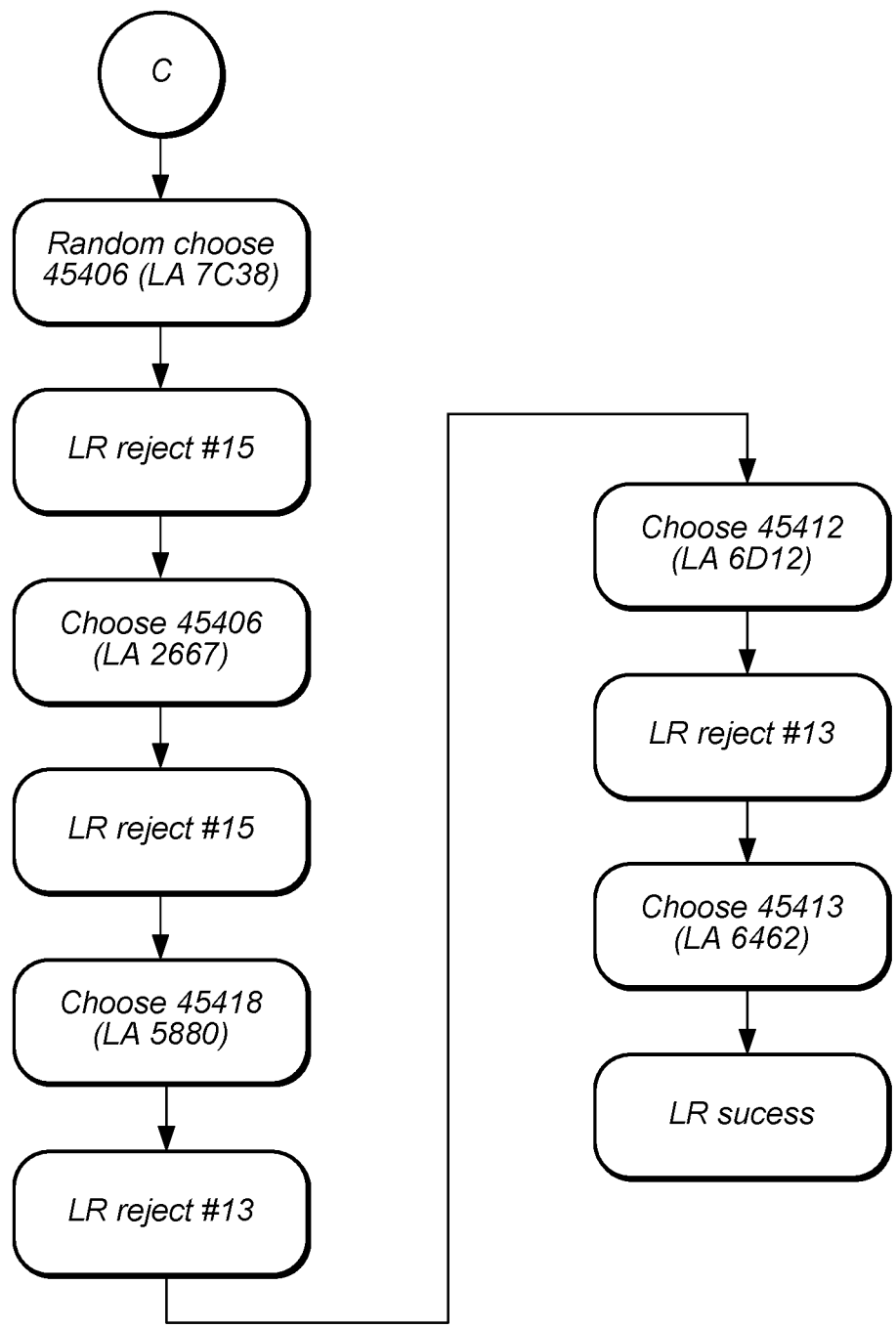
FIG. 15 is a flowchart illustrating results of implementing a portion of the method of FIGS. 12-14 according to an exemplary field log.

An exemplary field log illustrating the results of one such 'other PLMN selection' process is illustrated in FIG. 15. As shown, from point 'C' of the PLMN selection algorithm of FIGS. 12-14, the UE may initially choose PLMN 45406 (LA7C38) with which to attempt to register. Upon receiving reject cause code #15, the UE may choose PLMN 45406 (LA 2667) with which to attempt to register. Again receiving reject cause code #15 but having exhausted all LAs for PLMN 45406, the UE may choose PLMN 45418 (LA 5880) with which to attempt to register. Upon receiving reject cause code #13, the UE may then choose PLMN 45412 (LA 6D12) with which to attempt to register. Again receiving reject cause code #13, the UE may then choose PLMN 45413 (LA 6462) with which to attempt to register, and may at last successfully register. Such a process may take a significant amount of time (e.g., minutes), which may be noticeable to a user of the UE and during which time the UE may not be able to perform data exchanging using its cellular network interface.

Figure 16:
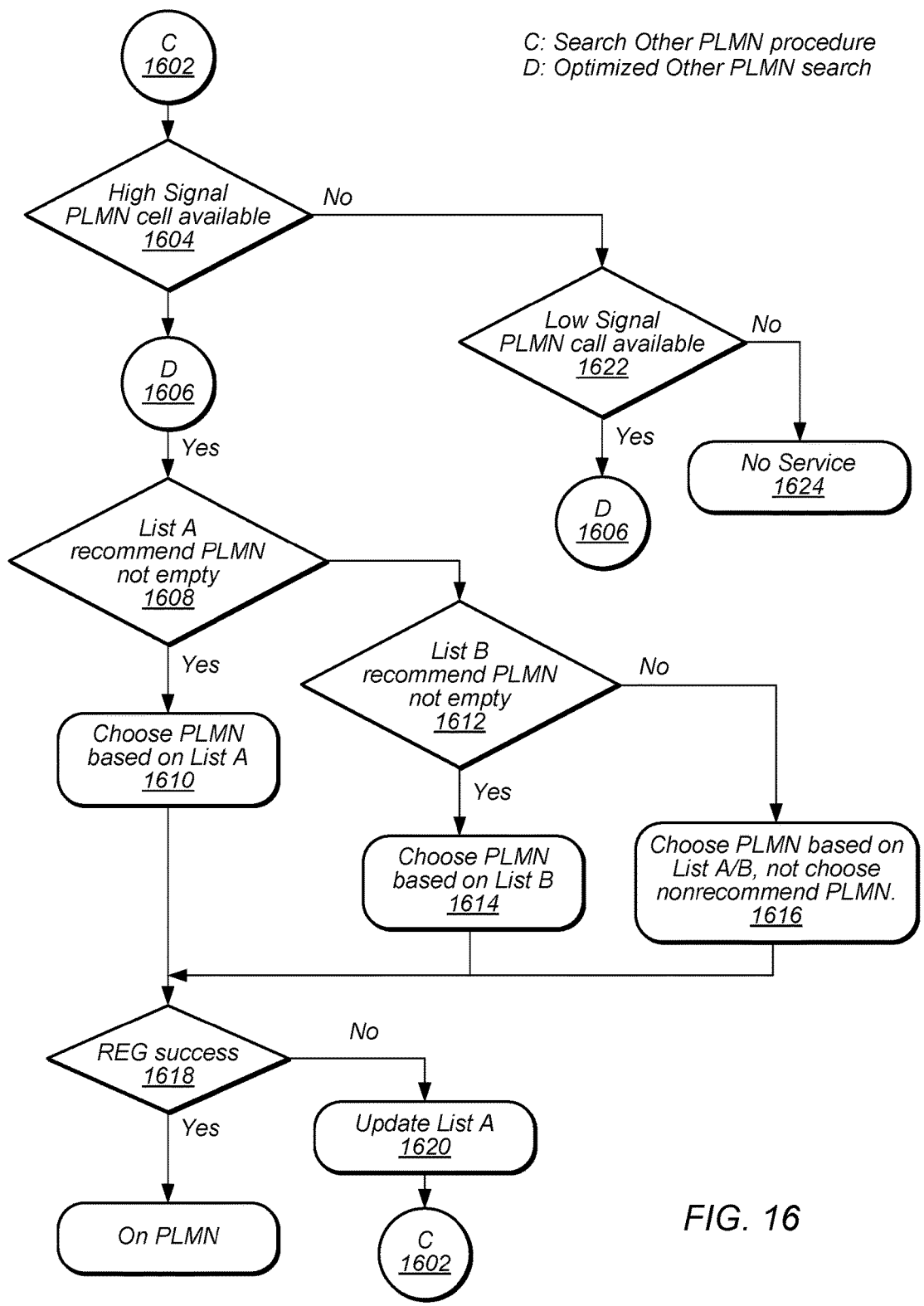
FIGS. 16-17 illustrate an exemplary alternate 'other PLMN selection' process.
Figure 17:
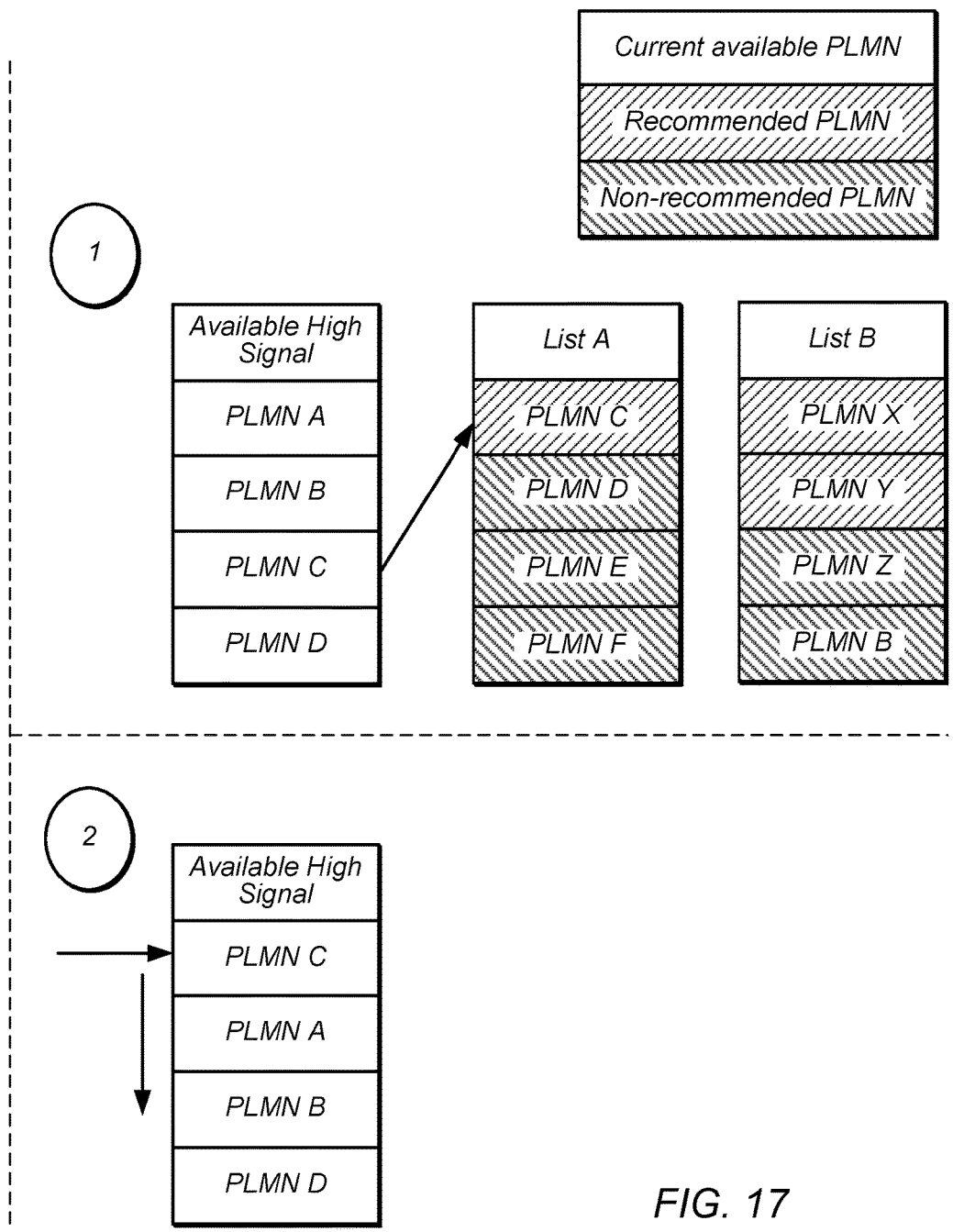

FIGS. 16-17 illustrate an exemplary alternate 'other PLMN selection' method which may be used. For example, the method of FIGS. 16-17 may be used in conjunction with the method of FIG. 12 in place of the methods of FIGS. 13-14 if desired.

The method of FIGS. 16-17 may utilize one or more device-specific priority based PLMN lists, leveraging the potentially greater storage capacity of a UE itself relative to a SIM card which may be relatively limited in memory capacity to provide a better chance of quickly selecting a PLMN with which the UE may successfully register.

A first device-specific priority based PLMN list, which may be referred to herein as 'list A' for convenience, may be generated by the UE itself. A UE's list A may be generated based on actual successes and failures of attempts by the UE to register with the PLMNs included in the list A. For example, upon successfully registering with a PLMN, a UE may add (or raise the priority of) that PLMN to its list A, and may possibly mark it as a 'recommended' PLMN. Contrariwise, upon unsuccessfully registering with a PLMN, a UE may add (or lower the priority of) that PLMN to its list A, and may possibly mark it as a 'not recommended' PLMN. Priorities of PLMNs included in the list A may be modified (e.g., periodically or in an event-based manner) as further results are accumulated, for example to change the PLMN priority order based on changes in rate of successful registration with various PLMNs in the list A by the UE. While the list A may be stored in device memory (e.g., rather than SIM memory), the list A may be associated with a particular SIM ID (e.g., since PLMN registration success and failure on which the list A is generated may depend significantly on a carrier associated with the SIM). Thus, at least in some instances, the list A may be flushed, reset, or at least temporarily be considered inactive and not used if a SIM card of the UE is removed. If desired, however, a copy of the list A may be re-instated if the SIM card associated therewith is again inserted in the UE.

A second device-specific priority based PLMN list, which may be referred to herein as 'list B' for convenience, may be provided (e.g., pushed) to the UE by a server. The list B may be provisioned according to the SIM card ID by the server, based for example on roaming agreements between the HPLMN of the UE/SIM and PLMNs in various possible roaming locations. Additionally, if desired, the list B may be provisioned based on actual registration results reported by the UE while using that SIM.

As shown in FIG. 16, the method may begin at point 'C' 1602. At decision 1604, it may be determined whether a high signal PLMN cell is available. If so, the method may proceed to point 'D' 1606. From point 'D' 1606, it may be determined if the UE's list A contains any available recommended PLMNs in decision 1608. If yes, in 1610 an attempt may be made to register with the highest priority recommended PLMN from the UE's list A. If in decision 1608 it is determined that the UE's list A does not contain any further available recommended PLMNs, the method may proceed to decision 1612, in which it may be determined whether or not the UE's list B contains any available recommended PLMNs. If yes, in 1614 an attempt may be made to register with the highest priority recommended PLMN from the UE's list B. If, however, in decision 1612 it is determined that the UE's list B does not contain any further available recommended PLMNs, in 1616 the UE may attempt to register with a high signal PLMN cell which isn't 'not recommended' in either of the UE's list A or list B, if such a cell is available, or make a random selection among any remaining 'not recommended' high signal PLMN cells if no other high signal PLMN cells are available.

In decision 1618 it may be determined whether or not the registration attempt (i.e., of attempted PLMN selection in step 1610, 1614, or 1616) is successful. If so, PLMN selection may be complete. In this case list A may be updated to reflect the successful registration attempt on the selected PLMN. Otherwise if the registration is unsuccessful, the list A may be updated in 1620 to reflect the unsuccessful registration attempt on that PLMN and the method may return to point 'C' 1602.

If from decision 1604 it is determined that no (further) high signal PLMN cells are available, the method may proceed to decision 1622, in which it may be determined whether any low signal PLMN cells are available. If there are not any low signal PLMN cells available either, it may be determined in 1624 that no service is available to the UE at that time. If, however, there is at least one low signal PLMN cell available, the method may proceed again to point 'D' 1606. The UE may then select a PLMN cell from among those low signal PLMN cells available based on list A and list B according to decisions and steps 1608, 1610, 1612, 1614, 1616, 1618, and 1622, in a similar manner as previously described with respect to selecting from among available high signal PLMN cells.

FIG. 17 illustrates an exemplary scenario in which the method of FIG. 16 could be implemented, and the potential results of such implementation.

As shown, the UE may have determined (e.g., via a search/band scan process) that four PLMNs ('PLMN A', 'PLMN B', 'PLMN C', and 'PLMN D') are available to the UE in its current location. According to the UE's list A, PLMN C may be a recommended PLMN, while PLMN D and two other PLMNs ('PLMN E' and 'PLMN F') are not recommended PLMNs. According to the UE's list B, two PLMNs which are not currently available ('PLMN X', 'PLMN Y') may be recommended, while PLMN B and another PLMN ('PLMN Z') are not recommended.

Based on these considerations, the UE may first attempt to register on PLMN C, since it is available and recommended on list A. If this is unsuccessful, the UE may next attempt to register on PLMN A, since it is available and not considered 'not recommended' on either list A or list B. Finally, if this is unsuccessful, the UE may attempt to register on either PLMN B or PLMN D, which though available high signal cells may be available for each, are considered 'not recommended' on the UE's list B and list A respectively.

Thus, by basing PLMN selection at least partially on a UE's own past registration outcomes, the amount of time to register with a PLMN and obtain cellular service in such 'other PLMN selection' roaming PLMN selection scenarios may be significantly reduced, and registration success rate in such scenarios may be significantly increased, which may improve user experience. As an additional benefit, reducing PLMN registration delays may also reduce UE power consumption.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a radio; and
a processing element operably coupled to the radio,
wherein the radio and the processing element are configured to:
store a first preferred public land mobile network (PLMN) list, wherein the first preferred PLMN list specifies a PLMN-radio access technology (RAT) priority order for roaming PLMN selection;
perform roaming PLMN selection based at least in part on the first preferred PLMN list; and
update the first preferred PLMN list based on performing roaming PLMN selection, wherein updating the first preferred PLMN list based on performing roaming PLMN selection comprises updating the first preferred PLMN list based on whether registration for selected PLMNs was successful, and wherein said updating the first preferred PLMN list comprises adding a new PLMN to the first preferred PLMN list or changing an order of the first preferred PLMN list.

2. The UE of claim 1, wherein the processing element is further configured to:
receive the first preferred PLMN list from a network.

3. The UE of claim 2, wherein the UE is of a first device type, wherein the first preferred PLMN list is generated based on crowd-sourced data from wireless devices of the first device type.

4. The UE of claim 2,
wherein a first PLMN is configured as a home PLMN (HPLMN) of the UE,
wherein the first preferred PLMN list is further configured for wireless devices whose HPLMN is the first PLMN.

5. The UE of claim 2, wherein the radio and the processing element are further configured to:
receive an update to the first preferred PLMN list;
store the updated first preferred PLMN list;

perform roaming PLMN selection based at least in part on the updated first preferred PLMN list.

6. The UE of claim 1, wherein the radio and the processing element are further configured to:
provide roaming selection data to a network based at least on said performing roaming PLMN selection; and
receive an update to the first preferred PLMN list from the network.

7. The UE of claim 6, wherein the roaming PLMN selection data comprises, per roaming PLMN selection attempt for which roaming PLMN selection data is collected by the UE:
Home PLMN (HPLMN) of the UE;
Visited PLMN (VPLMN);
an Equivalent Home PLMN (EHPLMN) flag indicating whether or not the VPLMN is considered an EHPLMN;
a registration result of the roaming PLMN selection attempt;
a number of retries performed in the roaming PLMN selection attempt;
a reject cause code, if the roaming PLMN selection attempt is unsuccessful;
a service domain; and
a RAT used in the roaming PLMN selection attempt.

8. The UE of claim 1, wherein the first preferred PLMN list is separate from a PLMN list stored on a SIM card of the UE.

9. A method for a wireless user equipment (UE) device to select a public land mobile network (PLMN), the method comprising:
by the UE:
storing a first preferred PLMN list, wherein the first preferred PLMN list specifies a PLMN-radio access technology (RAT) priority order for roaming PLMN selection;
performing roaming PLMN selection based at least in part on the first preferred PLMN list; and
updating the first preferred PLMN list based on performing roaming PLMN selection, wherein updating the first preferred PLMN list based on performing roaming PLMN selection comprises updating the first preferred PLMN list based on whether registration for selected PLMNs was successful, and wherein said updating the first preferred PLMN list comprises adding a new PLMN to the first preferred PLMN list or changing an order of the first preferred PLMN list.

10. The method of claim 9, wherein the UE is of a first device type, wherein the method further comprises:
receiving the first preferred PLMN list from a network, wherein the first preferred PLMN list is generated based on crowd-sourced data from wireless devices of the first device type.

11. The method of claim 9, further comprising:
receiving an update to the first preferred PLMN list;
storing the updated first preferred PLMN list;
performing roaming PLMN selection based at least in part on the updated first preferred PLMN list.

12. The method of claim 9, further comprising:
providing roaming selection data to a network based at least on said performing roaming PLMN selection; and
receiving an update to the first preferred PLMN list from the network.

13. The method of claim 12, wherein the roaming PLMN selection data comprises, per roaming PLMN selection attempt for which roaming PLMN selection data is collected by the UE:
Home PLMN (HPLMN) of the UE;
Visited PLMN (VPLMN);
an Equivalent Home PLMN (EHPLMN) flag indicating whether or not the VPLMN is considered an EHPLMN;
a registration result of the roaming PLMN selection attempt;
a number of retries performed in the roaming PLMN selection attempt;
a reject cause code, if the roaming PLMN selection attempt is unsuccessful;
a service domain; and
a RAT used in the roaming PLMN selection attempt.

14. The method of claim 9, wherein performing roaming PLMN selection is also based on an operator PLMN (OPLMN) list provided by a home PLMN (HPLMN) of the UE.

15. The method of claim 9, wherein the first preferred PLMN list is used by the UE in place of an operator PLMN (OPLMN) list provided by a home PLMN (HPLMN) of the UE when performing roaming PLMN selection.

16. An apparatus for inclusion in a wireless user equipment (UE) device, comprising:
one or more processing elements, wherein the one or more processing elements are configured to:
access a first preferred public land mobile network (PLMN) list, wherein the first preferred PLMN list specifies a PLMN priority order for roaming PLMN selection;
perform roaming PLMN selection based at least in part on the first preferred PLMN list; and
update the first preferred PLMN list based on performing roaming PLMN selection, wherein updating the first preferred PLMN list based on performing roaming PLMN selection comprises updating the first preferred PLMN list based on whether registration for selected PLMNs was successful, and wherein said updating the first preferred PLMN list comprises adding a new PLMN to the first preferred PLMN list or changing an order of the first preferred PLMN list.

17. The apparatus of claim 16, wherein the UE is of a first device type, wherein the one or more processing elements are further configured to:
receive the first preferred PLMN list from a network, wherein the first preferred PLMN list is generated based on crowd-sourced data from wireless devices of the first device type.

18. The apparatus of claim 16, wherein the one or more processing elements are further configured to:
receive an update to the first preferred PLMN list;
store the updated first preferred PLMN list;
perform roaming PLMN selection based at least in part on the updated first preferred PLMN list.

19. The apparatus of claim 16, wherein performing roaming PLMN selection is also based on an operator PLMN (OPLMN) list provided by a home PLMN (HPLMN) of the UE.

20. The apparatus of claim 16, wherein the first preferred PLMN list is used by the UE in place of an operator PLMN (OPLMN) list provided by a home PLMN (HPLMN) of the UE when performing roaming PLMN selection.

* * * * *